No. 662,012. Patented Nov. 20, 1900.
J. H. K. McCOLLUM.
FRICTION BRAKE.
(Application filed May 25, 1900.)

(No Model.)

Witnesses.
C. W. Arms
L. Trimble

Inventor:
J. H. K. McCollum.
by Featherstonhaugh & Co.
Attys.

UNITED STATES PATENT OFFICE.

JAMES HARRY KEIGHLY McCOLLUM, OF TORONTO, CANADA.

FRICTION-BRAKE.

SPECIFICATION forming part of Letters Patent No. 662,012, dated November 20, 1900.

Application filed May 25, 1900. Serial No. 17,971. (No model.)

*To all whom it may concern:*

Be it known that I, JAMES HARRY KEIGHLY MCCOLLUM, of the city of Toronto, in the county of York, in the Province of Ontario, Canada, have invented certain new and useful Improvements in Friction-Brakes, of which the following is a specification.

My invention relates to improvements in friction-brakes for autocars and other vehicles; and the object of the invention is to devise a simple, cheap, efficient, and positive-acting brake which will not be liable to get out of order and which may be put on with but a small application of power; and it consists, essentially, of a suitable wheel keyed to the wheel-axle and provided with a circular flange L-shaped in cross-section, a suitable inclosing casing loosely journaled on the axle and provided with a face-contact ring, preferably of wood fiber, designed to engage with the flange of the wheel, and a supplemental disk secured to the shaft and provided, preferably, with a wood-fiber face-contact ring, which extends within the flange of the wheel, the hub of such supplemental disk being provided with a collar between which and the hub of the inclosing casing is formed a V-shaped annular recess, into which extends wedge-wheels suitably supported and operated so as to throw the friction-contact faces into engagement with the flange of the wheel and cause the casing to rotate sufficiently to put on the brake, the casing being completely inclosed and containing oil at the bottom thereof, so that the wood-fiber friction-rings run in the same, the parts being otherwise constructed and arranged in detail, as hereinafter more particularly explained.

Figure 1:
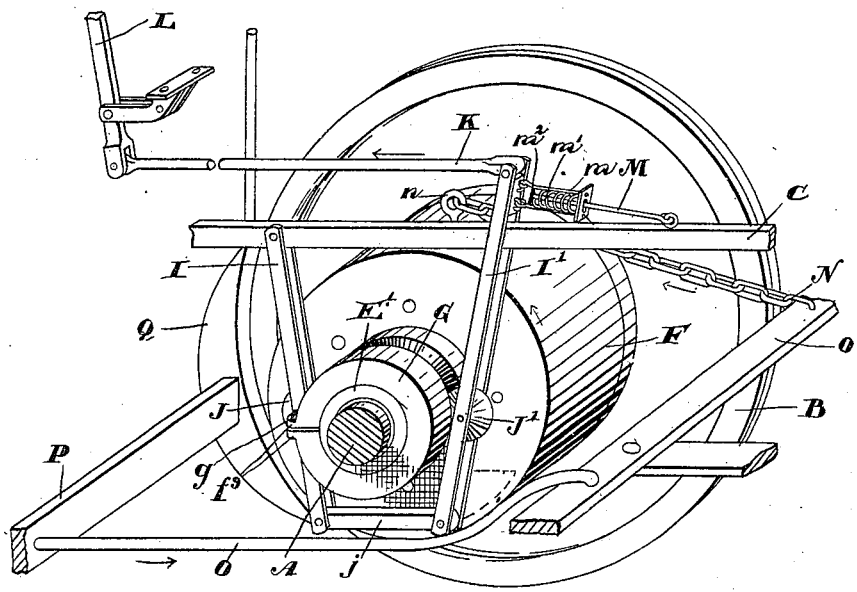
Figure 2:
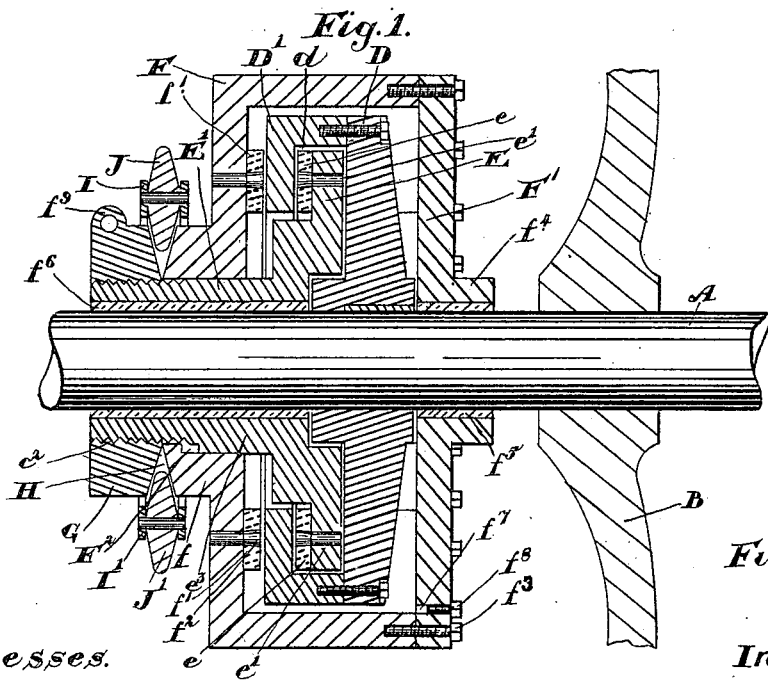

Figure 1 is a general perspective view, showing the axle and wheel of the car and the parts involved in my invention. Fig. 2 is a sectional plan view.

In the drawings like letters of reference indicate corresponding parts in each figure.

A is the axle of the car, B a wheel thereof, and C a bar secured to the bottom of the car.

D is a wheel suitably keyed to the axle of the car and provided with an annular flange D', L-shaped in cross-section, so as to form an annular recess $d$ between it and the face of the wheel D.

E is a disk provided with a hub E' and a friction contact-ring $e$, preferably of wood fiber, secured thereto by suitable pins or rivets $e'$ on the face near the periphery and opposite the inwardly-extending portion of the flange D'; the said face of which the ring E is to be brought into contact with, as will presently appear.

F is the circular casing provided with a hub portion $f$ and the face-ring $f'$, secured thereto by suitable rivets or bolts $f^2$. The face-ring is opposite the outer face of the flange E. F' is a large circular face-plate inclosing the casing, to which it is secured by suitable bolts $f^3$. The face-plate F' is provided with a hub $f^4$, which is journaled on a bushing $f^5$. The hub E' of the disk E is also journaled on a suitable bushing $f^6$. The casing F is partially filled with oil, as indicated in full lines in Fig. 2 and dotted lines in Fig. 1, so that the friction contact-rings $f'$ and $e$ rotate in the same. The hole $f^7$, with suitable closing-pin $f^8$, is provided in order to pour the oil into the casing. The end of the hub E' is threaded at $e^2$, as indicated, and has fitted onto it a collar G, which is clamped so as to hold it securely in position by the bolt $g$, passing through the bosses $f^9$ $f^9$. (See Fig. 1.)

It will be noticed that the abutting faces of the hub $f$ of the casing and of the collar G are beveled, so as to form a V-shaped recess H between them, as indicated.

I is a double bar pivotally supported upon the bar C and provided with a wedge-wheel J toward the edge.

I' is a bar provided with a similar wedge-wheel J'.

$j$ is a link connecting the double bars I and I' at the bottom.

It will be noticed that the wheels J fit within the V-shaped recesses H on each side of the axle and are held in such position by means of the rod K, connected at one end to the top of the double bar I' and at the other end to the operating-lever L. Of course this rod K may be connected to any suitable source of power for operating the double bars I and I'.

M is a rod connected to the bar C at one end and having the other end extending through the cage $m$, which is connected to the top of the double bar I', as indicated.

$m'$ is a spiral spring located between the outer end of the cage and a plate $m^2$ on the end of the rod M. The tendency of the spring $m'$ is of course to normally force the rollers J and J' out of the recess sufficiently far so as to prevent contact.

N is the brake-chain, connected at one end to an eyebolt $n$ on the casing F and at the other end to the brake-lever O, which is connected to the brake-beam P by the rod $o$, such brake-beam having attached to it the brake-shoes Q.

The hub E' of the disk E is provided with a key $e^3$, which fits into the corresponding key-slot $F^2$ in the casing F, so that the disk E will rotate with the case, although the slot $F^2$ is sufficiently long enough to permit longitudinal movement of the disk E in relation to the casing.

Having now described the principal parts involved in my invention, I shall briefly describe its operation. Upon power being applied so as to pull the rod K in the direction indicated by the arrow the wheels J and J' are brought to separate the collar G and casing F. By this means the case F is brought so as to bring its friction-contact ring $f'$ into contact with the outside face of the flange D' of the wheel D and the friction-ring $e$ of the disk E into contact with the inside face of the flange D', thereby momentarily uniting the wheel D and the casing F and disk E, so as to cause them to rotate by the friction, which it will be seen is very strong. As the casing F starts to rotate it pulls on the brake-chain N in the direction indicated by the arrow, thereby drawing upon the brake-lever and putting on the brake. Of course the friction-rings $f'$ and $e$ will slide upon the face of the flange D' of the wheel D to a certain extent, so as to relieve any chance of breakage. As the friction-rings are running in oil and are made of wood fiber they will wear a great length of time and will operate very effectually to put on the brake with but the expenditure of a minimum amount of power.

What I claim as my invention is—

1. The combination with the brake-shoes, lever and connections, of an inclosing casing loosely journaled on the axle and connected by chain to the brake-lever, the wheel keyed to the axle completely inclosed within said casing, a friction-ring secured to the inner face of the casing and means for longitudinally adjusting the casing, so as to throw the friction-ring in contact with the face of the wheel as and for the purpose specified.

2. The combination with the brake-shoes, a brake-lever and connections from the lever to the brake-shoes, of an inclosing casing loosely journaled on the axle, a connection therefrom to the brake-lever, the wheel keyed to the axle and provided with an overhanging and inwardly-extending flange with an annular space between the flange and the wheel, said wheel rotating with the axle, a disk loosely journaled on the axle and provided with a face-contact friction-ring designed to engage with the inner face of the flange and means for longitudinally adjusting the disk, so as to throw the friction-ring against the inner face of the flange to press the outer face of the flange and said casing together whereby the casing is shifted to apply the brake, as and for the purpose specified.

3. The combination with the brake-shoes, lever and connections, of an inclosing casing loosely journaled on the axle and connected by chain to the brake-lever, the wheel keyed to the axle and provided with an overhanging and inwardly-extending flange with an annular space between the flange and the wheel, a disk loosely journaled on the axle and provided with a face-contact friction-ring designed to engage with the inner face of the flange, a friction-ring secured to the inner side of the casing opposite the flange of the wheel and means for bringing the friction-rings close toward each other, so as to frictionally grip the flange as and for the purpose specified.

4. The combination with the brake-shoes, lever and connections, an inclosing casing loosely journaled on the axle and connected by chain to the brake-lever, of the wheel keyed to the axle and provided with an overhanging and inwardly-extending flange with an annular space between the flange and the wheel, a disk loosely journaled on the axle and provided with a face-contact friction-ring designed to engage with the inner face of the flange, a friction-ring secured to the inner side of the casing opposite the flange of the wheel, the collar secured on the hub of the friction-disk and forming with the end of the hub of the casing a V-shaped recess, the hanger double bars connected together by link, the wedge-wheels journaled in the same, means for normally holding them out of engagement and means for operating them to throw the wedge-wheels between the hub of the casing and collar, so as to separate them as and for the purpose specified.

5. The combination with the wheel keyed to the axle and the friction-disk loose on the axle provided with a contact-ring to frictionally engage the face of the wheel, of an inclosing casing designed to contain oil, a second friction-ring carried by said casing, and means for bringing the friction contact-rings into contact with the wheel as and for the purpose specified.

6. In a device of the class described, the combination with the casing secured to the axle and disk having a hub extending through the hub of the casing and provided with a threaded end, of the collar screwed onto the hub and the bolt extending through bosses on the collar, the wheel and the frictional surfaces, said surfaces being wholly contained in said casing, as and for the purpose specified.

JAMES HARRY KEIGHLY McCOLLUM.

Witnesses:
B. BOYD,
H. L. TRIMBLE.